(12) United States Patent
Sasaki et al.

(10) Patent No.: US 8,519,589 B2
(45) Date of Patent: Aug. 27, 2013

(54) MOTOR, MOTOR UNIT, BLOWER, AND ELECTRIC APPARATUS

(75) Inventors: Hiroshi Sasaki, Osaka (JP); Toshifumi Tsutsumi, Osaka (JP)

(73) Assignee: Panasonic Corporation, Osaka (JP)

( * ) Notice: Subject to any disclaimer, the term of this patent is extended or adjusted under 35 U.S.C. 154(b) by 432 days.

(21) Appl. No.: 13/039,609

(22) Filed: Mar. 3, 2011

(65) Prior Publication Data
US 2011/0223045 A1  Sep. 15, 2011

(30) Foreign Application Priority Data

Mar. 9, 2010 (JP) ................................. 2010-051391

(51) Int. Cl.
*H02K 17/10* (2006.01)

(52) U.S. Cl.
USPC ............................................ 310/172; 310/43

(58) Field of Classification Search
USPC ........ 310/172, 43, 71, 68 R, 90, 49.13–49.17
See application file for complete search history.

(56) References Cited

U.S. PATENT DOCUMENTS

| 2,492,207 | A | * | 12/1949 | Ballentine | 310/172 |
| 3,024,377 | A | * | 3/1962 | Tupper | 310/172 |
| 3,694,903 | A | * | 10/1972 | Deming | 29/596 |
| 4,071,787 | A | * | 1/1978 | Lautner et al. | 310/154.11 |
| 4,134,035 | A | * | 1/1979 | Donahoo | 310/49.27 |
| 4,482,832 | A | * | 11/1984 | Minton | 310/216.034 |
| 5,130,591 | A | * | 7/1992 | Sato | 310/172 |
| 5,729,071 | A | * | 3/1998 | Steiner | 310/216.022 |
| 6,975,049 | B2 | * | 12/2005 | Ionel et al. | 310/49.01 |
| 7,757,929 | B2 | * | 7/2010 | Ice et al. | 228/180.21 |
| 2007/0001527 | A1 | * | 1/2007 | Takahashi et al. | 310/71 |

FOREIGN PATENT DOCUMENTS

| JP | 61-35140 A | 2/1986 |
| JP | 5-939 B2 | 1/1993 |

* cited by examiner

*Primary Examiner* — Thanh Lam
(74) *Attorney, Agent, or Firm* — RatnerPrestia

(57) ABSTRACT

A stator core is formed of a main core including a first segment core, second segment core, and plate body, and a third segment core (I-shaped core). A rotor is disposed in a rotor insertion hole of the stator core, and an output shaft of the rotor is supported by a bearing unit. A resin molded body covers a winding of an exciting section of the motor, a circuit wiring board, and a part of a power supply connecting body. The resin molded body also covers a part of the third segment core (I-shaped core). A rotary vane or the like is mounted near the tip of the output shaft, and a blower or the like is formed.

15 Claims, 6 Drawing Sheets

MOTOR, MOTOR UNIT, BLOWER, AND ELECTRIC APPARATUS

TECHNICAL FIELD

The present invention relates to a motor that is mounted in an electric apparatus, such as a refrigerator, and drives a fan (rotary vane) for blowing air of the apparatus.

BACKGROUND ART

FIG. 5 shows a conventional motor. The conventional motor, as shown in FIG. 5, includes stator core 101, rotor 102, bearing unit 103 for holding rotor 102, and terminal 104 for supplying power from the outside.

FIG. 6A shows a plan view of conventional stator core 101, and FIG. 6B shows a perspective view thereof. As shown in FIG. 6A and FIG. 6B, stator core 101 has two inner diameters, namely inner diameter 105 and notch inner diameter 106, and has no slot open section (for example, Patent Literature 1 and Patent Literature 2).

In the structure of the conventional motor, a stator core is divided into two segment cores when the stator core has slot open sections. In a process of integrally combining each segment core, a rotor, and a bearing, the dimensional accuracy and assembling accuracy are required to be improved, and hence high technology is required. Therefore, when the dimensional accuracy and assembling accuracy are reduced by some failures, the decentering of an output shaft of the stator core or tilt (inclination) of the output shaft can occur, for example.

CITATION LIST

Patent Literature

[Patent Literature 1] International Patent Publication No. H05-939
[Patent Literature 2] Unexamined Japanese Patent Publication No. S61-35140

SUMMARY OF THE INVENTION

A motor of the present invention includes a first segment core having a first leg section and a first semicircular-arc teeth section, and a second segment core having a second leg section and a second semicircular-arc teeth section. Slot open sections are formed by arranging the first leg section of the first segment core and the second leg section of the second segment core in the same direction and by closely facing both tips of the teeth section of the first segment core to both tips of the teeth section of the second segment core. The motor further includes the following elements:
  plate bodies that bridge the slot open sections and are stacked on the first segment core and second segment core;
  a third segment core whose first end is bound to the first leg section of the first segment core and second end is bound to the second leg section of the second segment core;
  an exciting section formed of a winding and a coil bobbin that uses the third segment core as a magnetic core;
  a rotor disposed in a rotor insertion hole formed in a facing section of the teeth sections; and
  a pair of bearing units for supporting an output shaft penetrating the rotor.
In this motor, a main core formed of the plate bodies, the first segment core, and the second segment core is sandwiched between the pair of bearing units. The motor further includes a circuit wiring board for electrically interconnecting the winding of the exciting section and the power supply connecting body. At least the exciting section, the circuit wiring board, and a part of the power supply connecting body are covered with a resin molded body.

In such a structure, the pair of bearing units support the rotor and the main core is sandwiched between them, and the first segment core and the second segment core are sandwiched between two plate bodies to provide an integrated main core. Therefore, the positions of the first segment core and the second segment core are kept stable even if the dimensional accuracy of the bearing units or the like reduces and the bearing units deform.

DETAILED DESCRIPTION OF PREFERRED EMBODIMENTS

An exemplary embodiment of the present invention is described with reference to the accompanying drawings.

Figure 1:
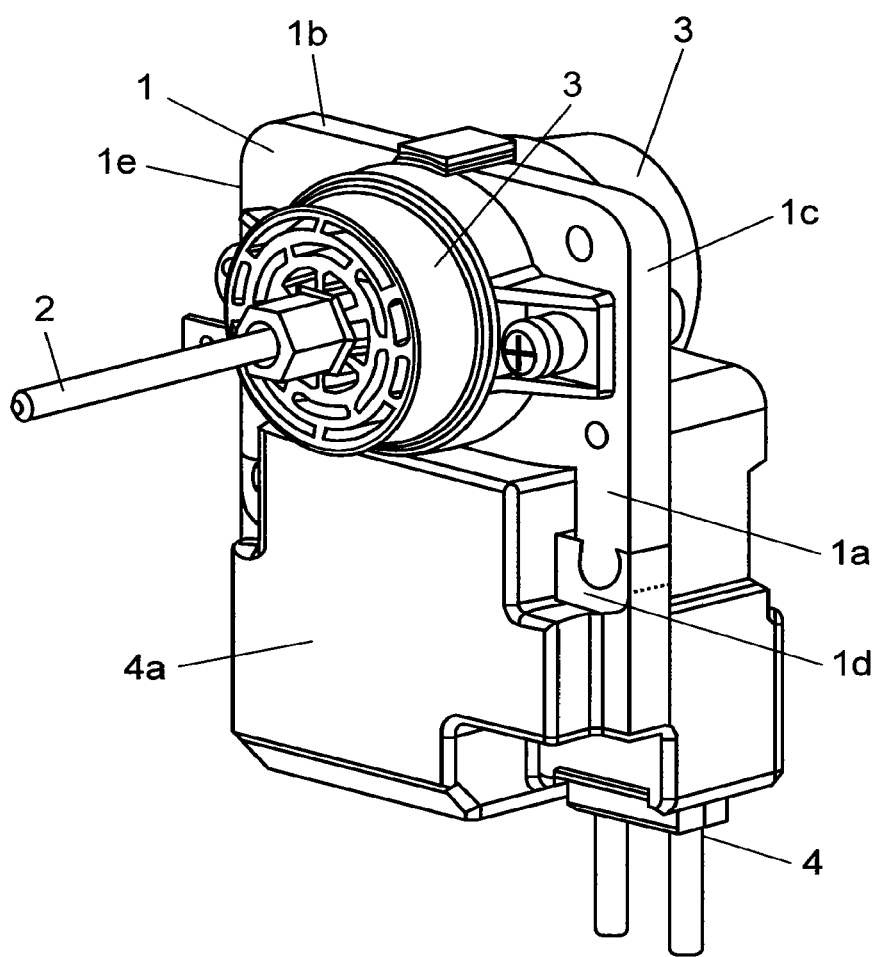
FIG. 1 is a perspective view of an outward appearance of a motor in accordance with an exemplary embodiment of the present invention.

FIG. 1 shows a motor in accordance with an exemplary embodiment of the present invention. As shown in FIG. 1, stator core 1 is formed of main core 1a that includes first segment core 1b, second segment core 1c, and plate bodies 1e, and third segment core (I-shaped core) 1d. A rotor (not shown) is disposed in a rotor insertion hole (not shown) of stator core 1. Output shaft 2 of the rotor is supported by bearing units 3. Resin molded body 4a covers a winding of an exciting section of the motor, a circuit wiring board, and a part of power supply connecting body 4. In the present exemplary embodiment, resin molded body 4a also covers a part of third segment core (I-shaped core) 1d.

A rotary vane or the like is mounted near the tip of output shaft 2, and a blower or the like is structured.

Figure 2A:
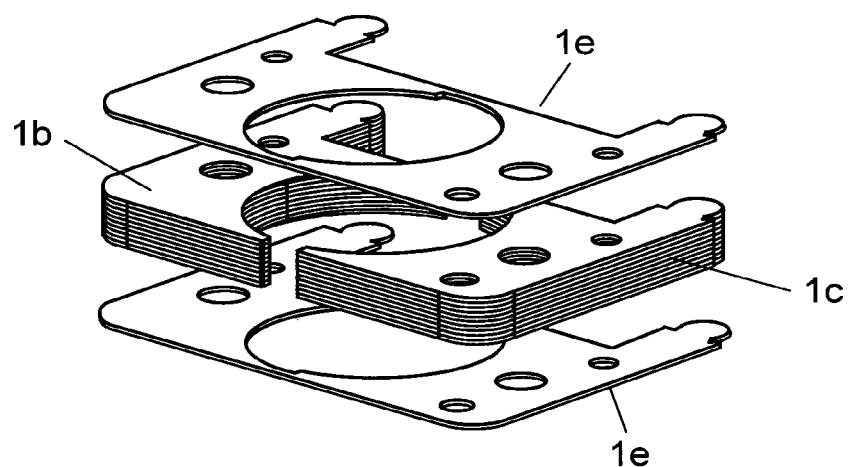
FIG. 2A is an exploded illustration diagram of a main core in accordance with the exemplary embodiment of the present invention.
Figure 2B:
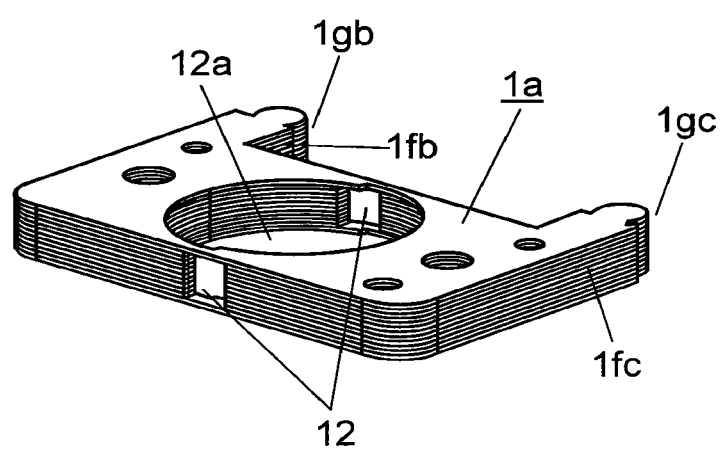
FIG. 2B is a perspective view of the main core in accordance with the exemplary embodiment of the present invention.

FIG. 2A and FIG. 2B show the state of main core 1a formed of first segment core 1b, second segment core 1c, and plate bodies 1e of the present invention. First segment core 1b and second segment core 1c are sandwiched between two plate bodies 1e to provide main core 1a, and slot open sections 12 and rotor insertion hole 12a are disposed. In FIG. 2A and FIG. 2B, first segment core 1b has first leg section 1fb and a first semicircular-arc teeth section, and second segment core 1c has second leg section 1fc and a second semicircular-arc teeth section. The slot open sections 12 are formed by arranging first leg section 1fb of first segment core 1b and second leg section 1fc of second segment core 1c in the same direction and by closely facing both tips of the teeth section of first segment core 1b to both tips of the teeth section of second segment core 1c. Plate bodies 1e bridge the slot open sections and are stacked on first segment core 1b and second segment core 1c so that the segment cores are sandwiched between plate bodies 1e.

As the segment cores and plate bodies, laminated bodies made of magnetic material such as electromagnetic steel plates are used. When first segment core 1b and second segment core 1c are sandwiched between two plate bodies 1e to be integrated to provide main core 1a, the electromagnetic steel plates are provided with an intertwined part or the like and are caulked and fixed. The end surfaces of the electromagnetic steel plates may be partially welded to each other to be integrated. Alternatively, the electromagnetic steel plates may be stuck to each other through an adhesive to be integrated.

The structure is also allowed where first segment core 1b is divided into two layers, second segment core 1c is divided into two layers, and plate bodies 1e are sandwiched between the layers of first segment core 1b and second segment core 1c.

Figure 3A:
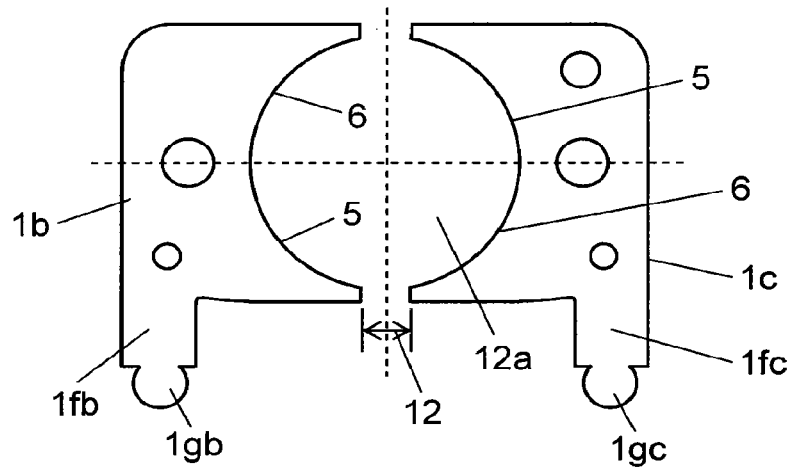
FIG. 3A is an illustration diagram of first and second segment cores in accordance with the exemplary embodiment of the present invention.
Figure 3B:
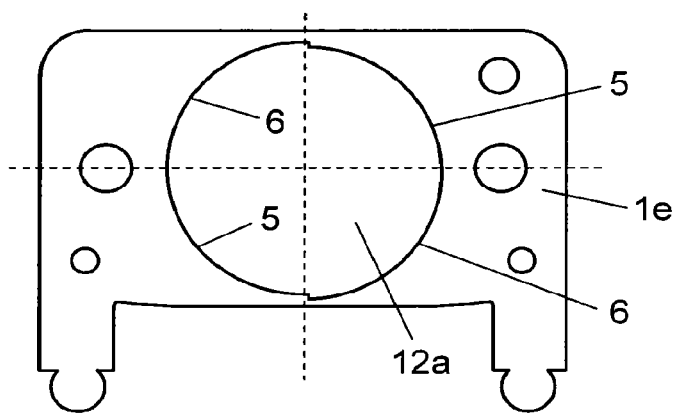
FIG. 3B is an illustration diagram of a plate body in accordance with the exemplary embodiment of the present invention.
Figure 3C:
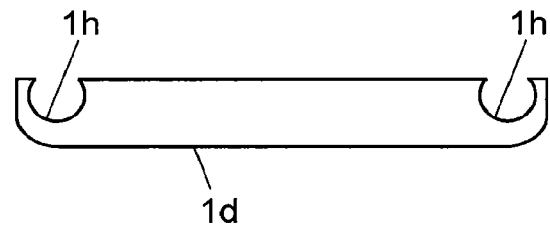
FIG. 3C is an illustration diagram of a third segment core in accordance with the exemplary embodiment of the present invention.

FIG. 3A shows the state of first segment core 1b and second segment core 1c, FIG. 3B shows the state of plate body 1e, and FIG. 3C shows the state of third segment core 1d. Stator core 1 is formed by integrating first segment core 1b, second segment core 1c, third segment core 1d, and plate bodies 1e. Next, rotor insertion hole 12a is described. The hole shape of rotor insertion hole 12a is formed by smoothly interconnecting two different circular arcs, namely circular arc 5 and circular arc 6. The shape of circular arc 5 is a part of a circular arc centering the center position of the output shaft of the rotor. The shape of circular arc 6 is a part of a circular arc centering a position separated from the center position of the output shaft of the rotor. Then, circular arc 5 and circular arc 6 in rotor insertion hole 12a are arranged as below. For describing the present exemplary embodiment, rotor insertion hole 12a is partitioned into first quadrant through fourth quadrant. Circular arc 5 is arranged in the first quadrant and third quadrant of rotor insertion hole 12a, and circular arc 6 is arranged in the second quadrant and fourth quadrant of rotor insertion hole 12a. The center of circular arc 6 is at the position separated from the center position of the output shaft of the rotor, but this separation distance is set within a range where circular arc 5 and circular arc 6 are interconnected smoothly.

Since the hole shape of rotor insertion hole 12a is formed of circular arc 5 and circular arc 6, a structure can be obtained where the positions of slot open sections 12 are not matched with the position of the pole of the rotor are not constant when the driving of the motor is stopped, namely the stop position is shifted magnetically.

As shown in FIG. 2A and FIG. 2B, plate bodies 1e having a shape to bridge the slot open sections are stacked on the uppermost layer side and the undermost layer side of stator core 1, first segment core 1b and second segment core 1c are arranged on the left and right sides of each diagram, and the uppermost layer side and the undermost layer side of slot open sections 12 are bridged by plate bodies 1e. Such a structure can increase the dimensional accuracy of the hole shape of rotor insertion hole 12a of stator core 1, and can further narrow the gap between rotor insertion hole 12a and the rotor.

The leg section side of binding sections where first leg section 1fb of first segment core 1b, second leg section 1fc of second segment core 1c, and third segment core (I-shaped core) 1d are bound has projections 1gb and 1gc, and the third segment core side has recesses 1h. The shapes of the binding surfaces of projections 1gb and 1gc and recesses 1h are substantially round viewed from the stacking direction of the segment cores, the root part of each projection has a neck part, and the neck parts are bound to the protrusions of the tips of the recesses.

Recesses 1h of third segment core (I-shaped core) 1d also work for positioning resin molded body 4a to a mold die when resin molded body 4a is molded. Recesses 1h have a round shape where the dimensional accuracy of the die is easily improved. The shape of third segment core 1d may be a bar shape.

Figure 4A:
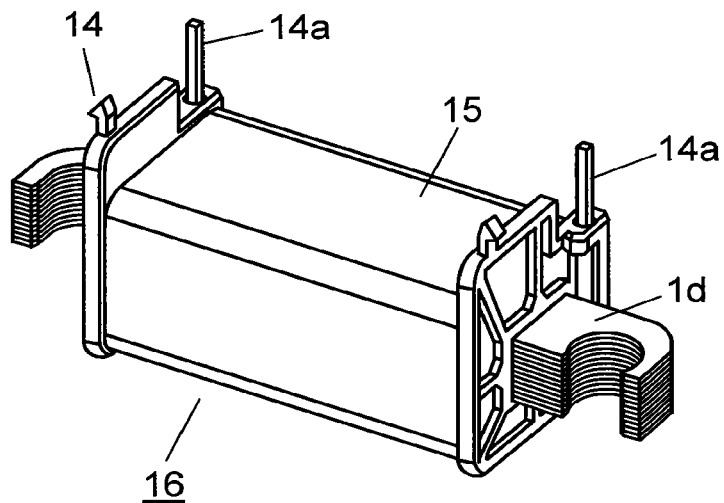
FIG. 4A is an illustration diagram of an exciting section in accordance with the exemplary embodiment of the present invention.
Figure 4B:
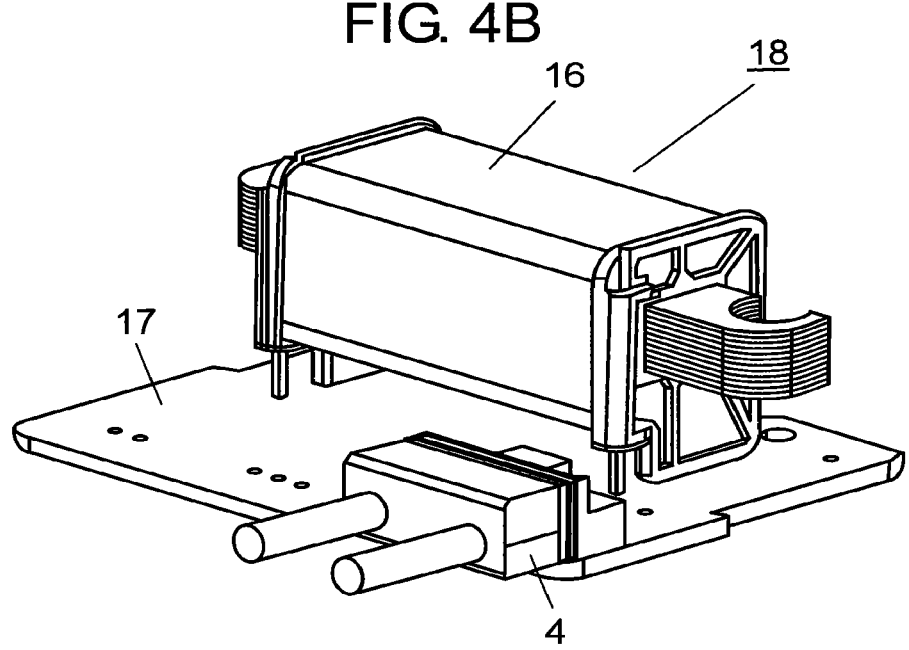
FIG. 4B is an illustration diagram of a stator partial assembly (before resin molding) in accordance with the exemplary embodiment of the present invention.
Figure 5:
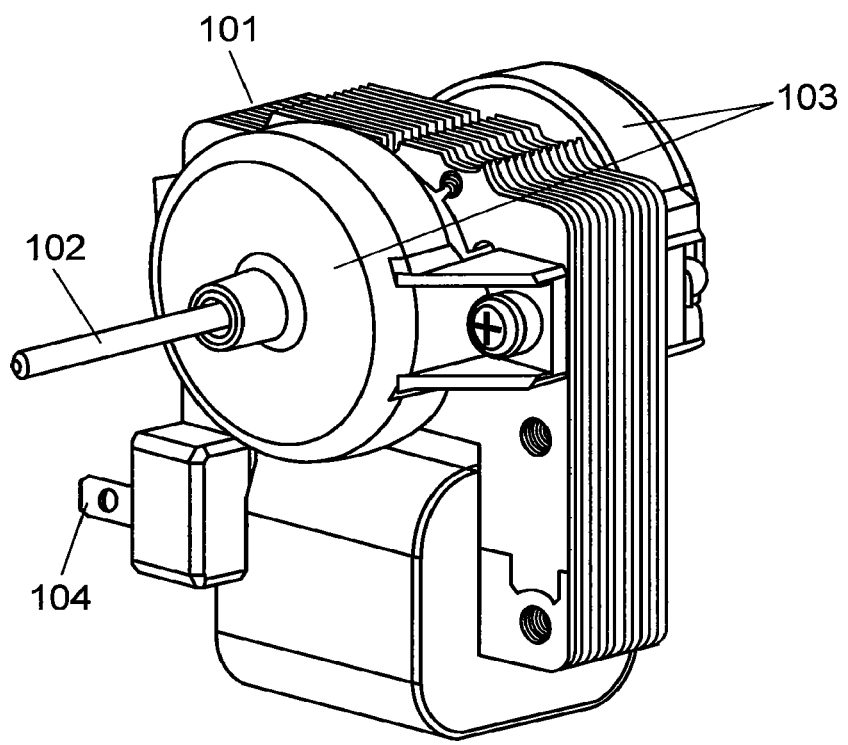
FIG. 5 is an outline view of a conventional motor.
Figure 6A:
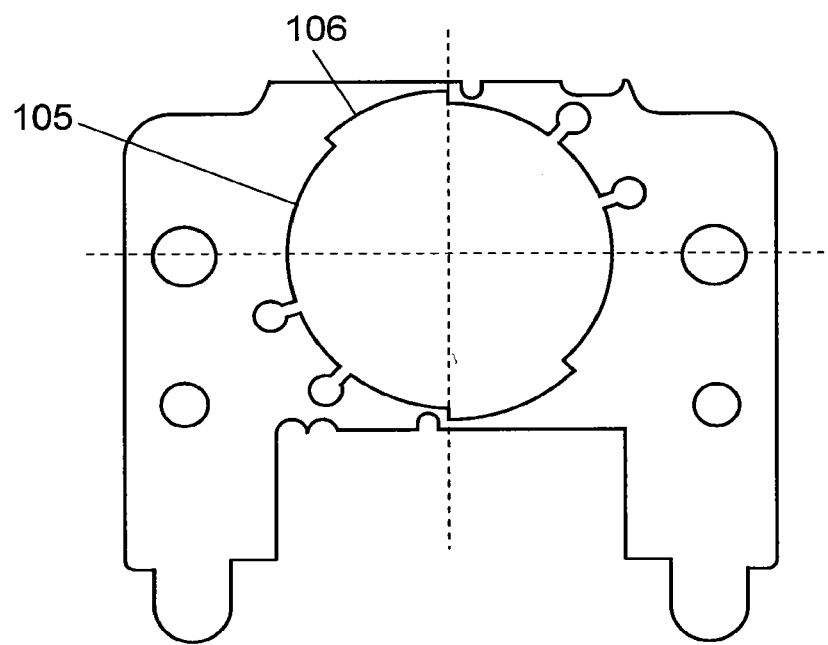
FIG. 6A is a plan view of a conventional stator core.
Figure 6B:
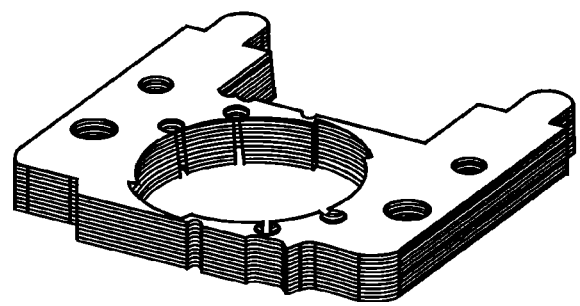
FIG. 6B is a perspective view of the conventional stator core.

Next, as shown in FIG. 4A and FIG. 4B, a single-phase winding is wound on bobbin 14 made of insulating material, thereby providing bobbin winding body 15. Third segment core (I-shaped core) 1d is inserted into bobbin winding body 15 to provide exciting section 16. Terminals 14a are disposed on part of bobbin 14, and the single-phase winding is connected to terminals 14a.

Exciting section 16 and power supply connecting body 4 are mounted on circuit wiring board 17, and terminals 14a are electrically connected to a terminal of power supply connecting body 4 by soldering of them to a circuit wiring pattern of circuit wiring board 17. A terminal on the other side of power supply connecting body 4 or a lead wire is connected to a power supply section from the outside.

In the present embodiment, exciting section 16 and power supply connecting body 4 are mounted on circuit wiring board 17, each terminal is soldered to the circuit wiring pattern, then at least exciting section 16, circuit wiring board 17, and a part of power supply connecting body 4 are covered with resin molded body 4a, thereby providing stator partial assembly 18. Main core 1a, the rotor, and bearing units 3 are combined with stator partial assembly 18 to complete a motor. Here, as each terminal, a bar-like square pin that is made of conductive metal and has a substantially square cross section or a bar-like pin having a circular cross section is selected appropriately.

As the material of the core of the wound winding in the motor of the present invention, an alloy containing at least copper and aluminum, or aluminum or an aluminum alloy containing minute quantities of impurities may be used.

As the material of the resin molded body in the motor of the present invention, either of thermosetting resin and thermoplastic resin may be used. For example, as the resin molded body, unsaturated polyester resin, phenol resin, or epoxy resin of thermosetting resin may be selected appropriately. As the resin molded body, polyethylene terephthalate resin or polybutylene terephthalate resin of thermoplastic resin may be also selected appropriately.

When the motor of the present invention is mounted on an apparatus, a motor unit is formed that has a fixture for apparatus mounting via a buffer that is inserted into a protrusion of the bearing unit near the output shaft. A blower is formed by mounting a rotary vane from the tip side of the output shaft of the motor unit.

The rotor of the present invention is formed by molding a plastic magnet material in a cylinder shape, and has a plurality of N and S magnetic poles on its outer periphery. However, as the structure of the rotor, a structure other than the above-mentioned structure may be selected.

In the structure of the present invention, the pair of bearing units 3 support the rotor and main core 1a is sandwiched between them, and first segment core 1b and second segment core 1c are sandwiched between two plate bodies 1e to provide integrated main core 1a. Therefore, the positions of first segment core 1b and second segment core 1c are kept stable even if the dimensional accuracy of bearing units 3 or the like reduces and the bearing units deform.

Therefore, the variation of the magnetic circuit of the motor is reduced, and hence the variation of the motor characteristics is reduced. The reduction in variation of the motor characteristics additionally contributes to the performance stability of a motor mounted apparatus, and provides a large industrial value.

Decentering or tilt of the output shaft of the motor is suppressed, and the variation of the motor characteristics can be reduced.

If bearing units 3 have twisted strain in a structure where there is no plate body 1e and first segment core 1b is separated from second segment core 1c, the positions of first segment core 1b and second segment core 1c are correctively displaced from the normal positions due to the strain of bearing units 3 by attaching of bearing units 3. If the screwing position of a screw is inappropriate and bearing units 3 deform in the case where bearing units 3 are screwed, the positions of first segment core 1b and second segment core 1c are correctively displaced from the normal positions. The present invention can reduce the frequency of such failures.

The motor of the present invention may have a structure where an earth section of an electric apparatus mounted with the motor is electrically connected to the main core of the motor. This structure is added to satisfy the specification required for the motor of the present invention and the electric apparatus side mounted with the motor.

The invention claimed is:

1. A motor comprising:
a first segment core having a first leg section and a first semicircular-arc teeth section;
a second segment core having a second leg section and a second semicircular-arc teeth section;
a plate body that bridges a slot open section and is stacked on the first segment core and the second segment core, the slot open section being formed by arranging the first leg section of the first segment core and the second leg section of the second segment core in the same direction and by closely facing both tips of the teeth section of the first segment core to both tips of the teeth section of the second segment core;
a third segment core, a first end of the third segment core being bound to the first leg section of the first segment core, a second end of the third segment core being bound to the second leg section of the second segment core;
an exciting section formed of a coil bobbin and a winding, the coil bobbin using the third segment core as a magnetic core;
a rotor disposed in a rotor insertion hole formed in a facing section of the teeth sections; and
a pair of bearing units for supporting an output shaft penetrating the rotor,
wherein a main core formed of the plate body, the first segment core, and the second segment core is sandwiched between the pair of bearing units,
wherein the motor has a circuit wiring board for electrically inter-coupling the winding of the exciting section and a power supply connecting body, and
wherein at least a part of the exciting section, the circuit wiring board, and a part of the power supply connecting body are covered with a resin molded body.

2. The motor of claim 1, wherein
the first semicircular arc shape and the second semicircular arc shape are a part of a circular arc centering a center position of the output shaft and a part of a circular arc centering a position separated from the center position of the output shaft, respectively.

3. The motor of claim 1, wherein
the first segment core and the second segment core are sandwiched between the two plate bodies.

4. The motor of claim 1, wherein
the first segment core is divided into two layers, the second segment core is divided into two layers, and the plate body is sandwiched between the layers of the first segment core and the second segment core.

5. The motor of claim 1, wherein
the leg section side of a binding section where the first leg section of the first segment core, the second leg section of the second segment core, and the third segment core are bound has a projection, and the third segment core side has a recess,
a shape of a binding surface of the projection and the recess is substantially round viewed from a stacking direction of the segment cores,
a root part of the projection has a neck part, and
a protrusion of the tip of the recess is bound to the neck part.

6. The motor of claim 1, wherein
the third segment core has a bar shape.

7. The motor of claim 1, wherein
at least one surface of the circuit wiring board has circuit wiring, the power supply connecting body is disposed on a circuit wiring side of the circuit wiring board, and a terminal of the power supply connecting body and the circuit wiring are connected electrically on the circuit wiring side of the circuit wiring board.

8. The motor of claim 1, wherein
the bearing units straddle the rotor insertion hole and bridge the first segment core side and the second segment core side.

9. The motor of claim 1, wherein
material of the core of the wound winding is an alloy containing at least copper and aluminum, or aluminum or an aluminum alloy containing minute quantities of impurities.

10. The motor of claim 1, wherein
material of the resin molded body is thermosetting.

11. The motor of claim 1, wherein
material of the resin molded body is thermoplastic.

12. A motor unit comprising the motor of claim 1 and a fixture for apparatus mounting via a buffer inserted into a protrusion of the bearing units near the output shaft.

13. A blower comprising a rotary vane mounted on the output shaft from the chip side of the shaft of the motor unit of claim 12.

14. An electric apparatus comprising the blower of claim 13.

15. The motor of claim 1, wherein
a part of the main core is electrically coupled to an earth section of an electric apparatus mounted with the motor.

* * * * *